Patented Jan. 20, 1942

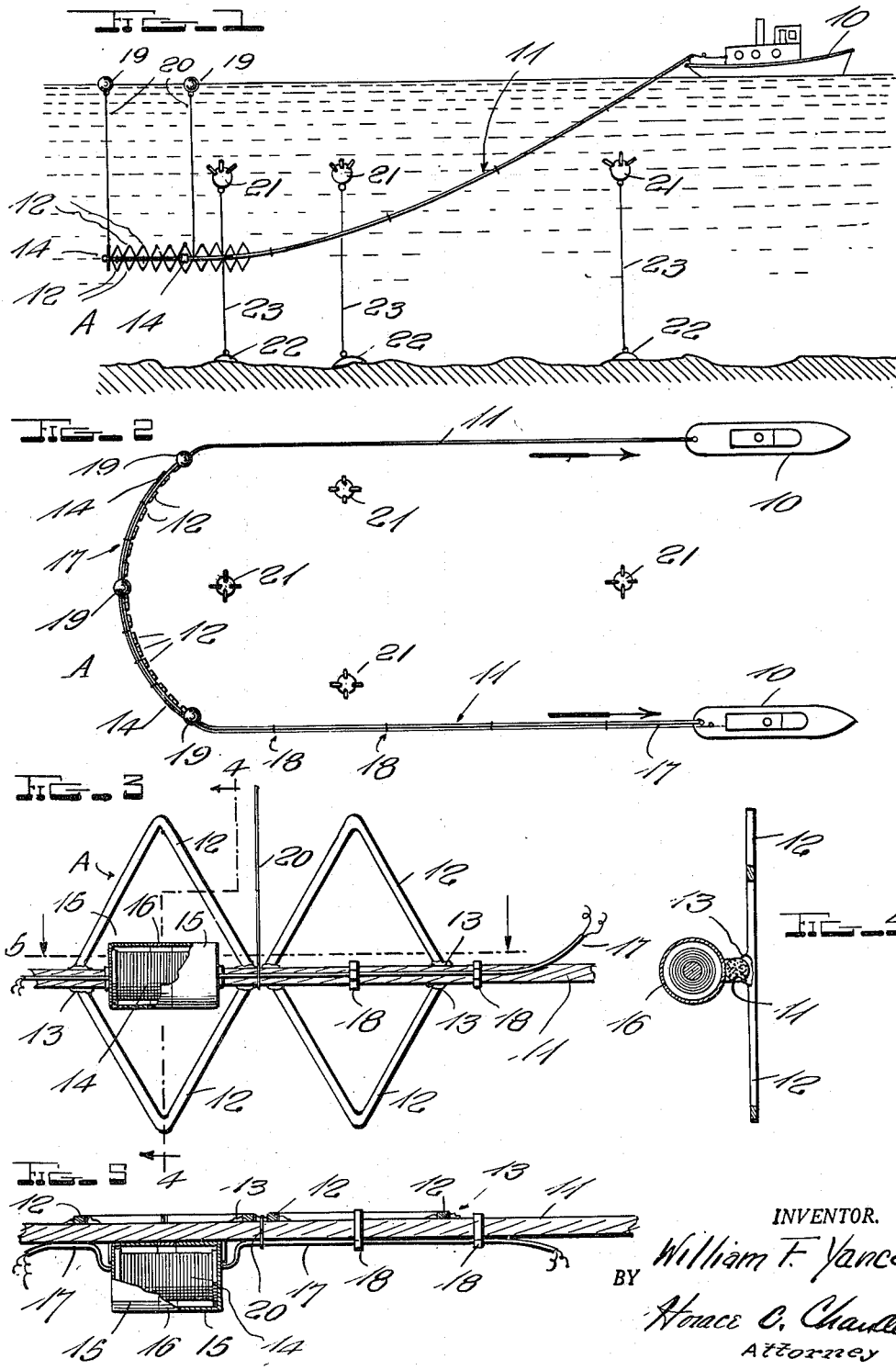

2,270,694

UNITED STATES PATENT OFFICE 2,270,694

MINE-SWEEPING APPARATUS

William F. Yancey, Philadelphia, Pa., assignor of one-half to Morris Fishbein, Philadelphia, Pa.

Application November 8, 1940, Serial No. 364,917

3 Claims. (Cl. 114—221)

This invention relates to apparatuses for locating and removing submarine mines by the process commonly known as "sweeping."

An object of the invention is to provide a novel sweeping member for apparatuses of the kind mentioned, which member will be so constructed that after contacting the cables by means of which the mines are secured to their anchors, it will be guided to and caused to remove the mines.

A further object is to provide a sweeping member having electromagnets attached thereto for the purpose of drawing the mines towards the sweeping member.

In the drawing:

Fig. 1 is a side elevation of the improved mine-sweeping apparatus when in use,

Fig. 2 is a plan view of the same,

Fig. 3 is a fragmentary view illustrating certain parts of the invention in detail, Fig. 4 is a section on the line 4—4 of Fig. 3, and Fig. 5 is a plan view of the invention as illustrated in Fig. 3.

Referring to the drawing, 10 designates each of a pair of towboats which may be of any suitable type. To the stern of each boat is connected an end of a metal cable 11, the connections being made in such a manner as will permit of the cable's being payed out to the desired extent, as with the use of ordinary towing bits. The sweeping member, which will hereinafter be referred to as the "sweep" and which constitutes the present invention, will, as usual, be drawn beneath the surface of the water. The sweep, which is designated generally at A, is formed by securing to the cable 11 intermediate its ends a series of diamond-shaped frames or teeth 12 arranged in close relation and secured to the cable at their centers by welding, as indicated at 13, or in any other suitable manner. Because of the frame-like or open construction of the teeth 12, they will offer but little resistance to the water while being drawn therethrough.

Attached to the cable 11 are any desired number of electromagnets 14 which are disposed opposite the openings of certain of the teeth 12. Each of the electromagnets 14 is surrounded by a watertight casing consisting of two end sections 15 formed of magnetic metal and connected at their centers by a section 16 of nonmagnetic metal. The end sections 15 contact the ends of the core of the magnet, as a result of which they become, respectively, the positive and negative magnetic poles. The electromagnets are secured to the cable 11 in any suitable manner, such as by having their casings welded thereto, and are energized by electricity delivered thereto through conductors in the form of a cable 17 which is attached to the cable 11 in any suitable manner, as by clips 18, and which leads to a source of electricity on one of the towing boats. The magnets 14 also serve as weights to hold the sweep A in submerged position. In order to limit the degree to which the sweep will become submerged, however, floats 19, constructed in any desired manner, are connected to the cable 11 between certain of the teeth 12 by means of cables 20 of suitable length. The floats 19 are adapted to float on the surface of the water. Mines in the path of the sweep A are indicated at 21, and the cables by means of which they are secured to their anchors 22 are designated at 23.

It will be understood that the teeth 12 may be stamped from sheet metal or constructed in any other desired manner. It will also be understood that the electromagnets 14 may be energized by electrical conductors leading from either of the towboats 10.

When the invention is in use, the mooring cables 23 of the mines will be engaged in the crotches between the teeth 12 of the sweep A as the latter is being drawn through the water. As the sweep progresses, the mines 21 will be engaged by the teeth and will become disconnected from their anchors, permitting them to float to the surface where they may be handled in the manner common to mine-sweeping. The electromagnets will cause the mines to be attracted towards the sweep. Due to the fact that the teeth 12 project at opposite sides of the cable 11, they will be in position to engage the mooring cables 23 even though the sweep may become inverted while in use. The sweep will also function effectively whether the teeth are in a vertical, horizontal, or other plane.

With the improved construction of the sweep shown and described herein, it is obvious that it will perform its function much more efficiently than devices that have heretofore been used for the same purpose.

What is claimed is:

1. A mine-sweeping apparatus including a cable adapted to be connected at its ends to towboats, a series of diamond-shaped teeth secured to the cable at their approximate centers and projecting at opposite sides of said cable, and a float tethered to the cable within the bounds of the series of teeth, said teeth being of open frame-like construction and being secured to the cable in close relation, whereby the confronting side edges of each pair of adjacent teeth form a crotch adapted to receive a mooring cable.

2. A mine-sweeping apparatus including a cable adapted to be connected at its ends to towboats, a series of diamond-shaped teeth secured to the cable at their approximate centers whereby to project at opposite sides of said cable, a float tethered to the cable within the bounds of the series of teeth, electromagnets supported by the cable opposite the openings of certain of the teeth, and means for energizing the magnets.

3. A mine-sweeping apparatus including a cable adapted to be connected at its ends to towboats, a series of diamond-shaped teeth secured to the cable at their approximate centers whereby to project at opposite sides of said cable, a float tethered to the cable within the bounds of the series of teeth, electromagnets supported by the cable opposite the openings of certain of the teeth, each of said magnets including a watertight casing comprising end sections formed of magnetic metal connected by a section formed of non-magnetic metal, and means for energizing the magnets.

WILLIAM F. YANCEY.